United States Patent
Yamamoto et al.

(10) Patent No.: US 7,029,754 B2
(45) Date of Patent: Apr. 18, 2006

(54) SCRATCHABLE HIDING LAYER-FORMING SILICONE COMPOSITION

(75) Inventors: Kenji Yamamoto, Gunma-ken (JP); Katsuma Baba, Gunma-ken (JP); Masahiko Ogawa, Gunma-ken (JP)

(73) Assignee: Shin-Etsu Chemical Co.,Ltd., Tokyo (JP)

( * ) Notice: Subject to any disclaimer, the term of this patent is extended or adjusted under 35 U.S.C. 154(b) by 339 days.

(21) Appl. No.: 10/195,459

(22) Filed: Jul. 16, 2002

(65) Prior Publication Data

US 2003/0027913 A1 Feb. 6, 2003

(30) Foreign Application Priority Data

Jul. 16, 2001 (JP) ............................... 2001-215244

(51) Int. Cl.
*C08L 83/00* (2006.01)
*B32B 9/04* (2006.01)

(52) U.S. Cl. .................. 428/447; 524/424; 524/440; 524/441; 524/588; 525/477; 525/478; 525/479; 528/31; 528/32; 528/43

(58) Field of Classification Search ........ 525/477–479; 524/588; 528/15, 31, 32
See application file for complete search history.

(56) References Cited

U.S. PATENT DOCUMENTS

| | | | |
|---|---|---|---|
| 4,255,316 A * | 3/1981 | Blizzard | 524/433 |
| 4,631,299 A | 12/1986 | Laisney et al. | |
| 4,806,391 A * | 2/1989 | Shorin | 427/288 |
| 5,324,542 A | 6/1994 | Modic | |
| 5,925,440 A | 7/1999 | Farag et al. | |
| 6,201,055 B1 * | 3/2001 | Lutz et al. | 524/493 |
| 2002/0007014 A1 * | 1/2002 | Hyde et al. | 525/191 |

FOREIGN PATENT DOCUMENTS

| | | |
|---|---|---|
| CA | 1 190 987 A | 7/1985 |
| JP | 2-3897 Y2 | 1/1990 |
| JP | 2-297482 A | 12/1990 |

OTHER PUBLICATIONS

Silicones, An Introduction to Their Chemistry and Applications, Freeman, G.G., lliffe Books, Ltd., p. 27.*

* cited by examiner

*Primary Examiner*—Marc S Zimmer
(74) *Attorney, Agent, or Firm*—Birch,Stewart,Kolasch & Birch,LLP

(57) ABSTRACT

A hiding layer-forming silicone composition comprising (A) a diorganopolysiloxane comprising structural units of formula (1) and having an average degree of polymerization of at least 50,

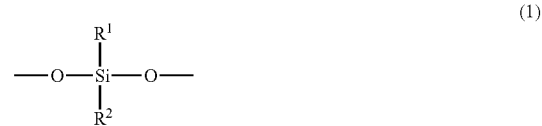

wherein $R^1$ is alkyl or aryl, and $R^2$ is alkyl, aryl, alkenyl, alkoxy, alkoxyalkoxy, hydroxyl or epoxy, (B) an organopolysiloxane comprising structural units of formulae (2) and (3):

$$(R^1-)_n(R^2-)_{3-n}Si-O- \tag{2}$$

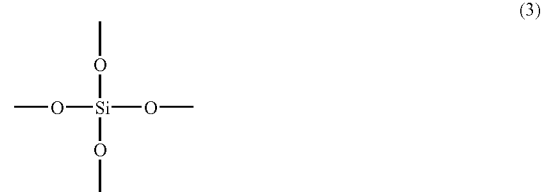

wherein $R^1$ and $R^2$ are as defined above, n is an integer of 1 to 3, (C) an inorganic powder opacifier, (D) a curing catalyst, and (E) an organic solvent is effectively curable and capable of forming a hiding layer which temporarily adheres well to various substrates of paper, synthetic paper and plastic film while it remains scratchable.

15 Claims, No Drawings

SCRATCHABLE HIDING LAYER-FORMING SILICONE COMPOSITION

This invention relates to silicone compositions suitable for forming hiding layers on scratch-off tickets used in instant lottery.

BACKGROUND OF THE INVENTION

Scratch-off tickets used in instant lottery are typical of sheets having an opacifying or hiding layer which hides images printed beneath and which is readily removable as by scratching or rubbing. Such scratch-off tickets are described in JP-U 2-3897 and JP-A 2-297482.

The scratch-off ticket is constructed such that a printed sheet based on a paper or similar substrate is locally covered with a hiding layer so that the printed images are hidden thereby. The hiding layer can be readily removed by scratching it with a nail, coin or pick, or by attaching adhesive tape thereto and peeling the tape.

The hiding layers are conventionally formed from compositions comprising inorganic powder opacifiers such as aluminum fine powder, brass fine powder, copper fine powder and such metal oxide fine powder, synthetic resin vehicles such as acrylic resins and polyester resins, and organic solvents for dissolving them.

Using suitable techniques such as printing, these compositions are coated to substrates having printed thereon images to be hidden, to form hiding layers thereon. The synthetic resins commonly used as the vehicle are relatively hard resins for the reason that when an amount of heat just enough for drying or solvent evaporation is applied, the resin is converted to an under-cured state because of its relatively slow cure rate and thus retains a certain degree of binder function. More energy and time are necessary for the resin to fully cure, which is unwanted from the standpoint of manufacturing process. It would be desirable to have more curable vehicles.

Under the current circumstances, hard vehicles must be used. However, hard hiding layers adhere poorly to flexible substrates of paper or plastic film, failing to provide a satisfactory tack or temporary bond. It is then a common practice to form an intercoat between the substrate and the hiding layer for improving the temporary bonding force. It is then necessary to form two coats, intercoat and hiding layer, and the overall manufacturing process becomes a cumbersome operation.

Since the intercoat for improving the temporary bonding force is formed of a material which is well adherent to the hiding layer, it interferes with the ease of removal of the hiding layer by scratching, indicating that the necessary function of the hiding layer is lost. A countermeasure taken against this interference is to add a silicone parting agent to the hiding layer composition. Small amounts of the parting agent fail to ensure ease of scratch-off whereas large amounts of the parting agent detract from the temporary bonding force. It is then difficult to determine an optimum amount of the parting agent. An increased cost is also a problem.

SUMMARY OF THE INVENTION

An object of the invention is to provide a hiding layer-forming silicone composition which is effectively curable and capable of forming a hiding layer which temporarily adheres well to various substrates of paper, synthetic paper and plastic film without a need for an intercoat or parting agent while it remains scratchable.

It has been found that a silicone composition comprising (A) a diorganopolysiloxane of a specific structure, (B) an organopolysiloxane of a specific structure, (C) an inorganic powder opacifier, (D) a curing catalyst, and (E) an organic solvent or a silicone composition comprising a reaction product arising from the reaction of (A) diorganopolysiloxane with (B) organopolysiloxane in the presence of a basic catalyst, (C) inorganic powder opacifier, and (E) organic solvent cures to any substrate to form a hiding layer thereon, permits the time necessary for curing to be reduced, and can render the working process more efficient. The hiding layer has a sufficient tack to the substrate until it is rubbed off, and itself possesses appropriate scratch capabilities including flexibility and fragility for ease of rub-off. Because of these unique tack and scratch-providing mechanisms, the silicone composition achieves high levels of both tack to various substrates of paper, synthetic paper and plastic film and scratchability without a need for the provision of an intercoat or the blending of a parting agent. As used herein, the term "tack" means that a layer or coating of the composition is temporarily adherent to a substrate.

In a first embodiment, the invention provides a hiding layer-forming silicone composition comprising (A) 100 parts by weight of a diorganopolysiloxane primarily comprising structural units of the following formula (1) and having an average degree of polymerization of at least 50,

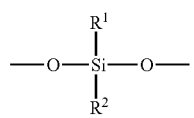

(1)

wherein $R^1$ is a substituted or unsubstituted alkyl or aryl group having 1 to 20 carbon atoms, $R^2$ is $R^1$, alkenyl, alkoxy, alkoxyalkoxy, hydroxyl or epoxy group, each of $R^1$ and $R^2$ is identical or different, and O is shared between adjoining structural units to form a siloxane bond, (B) 10 to 200 parts by weight of an organopolysiloxane primarily comprising structural units of the following formulae (2) and (3):

$$(R^1-)_n(R^2-)_{3-n}Si-O-$$ (2)

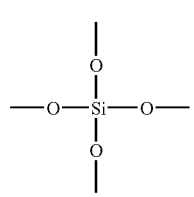

(3)

wherein $R^1$ and $R^2$ are as defined above, n is an integer of 1 to 3, and O is shared between adjoining structural units to form a siloxane bond, (C) 10 to 500 parts by weight of an inorganic powder opacifier per 100 parts by weight of components (A) and (B) combined, (D) an effective amount of a curing catalyst for causing components (A) and (B) to cure, and (E) an organic solvent.

When the diorganopolysiloxane (A) or the diorganopolysiloxane (A) and the organopolysiloxane (B) have alkenyl groups, the preferred curing catalyst (D) includes an organohydrogenpolysiloxane having at least three silicon-bonded hydrogen atoms on the molecule and a platinum group metal catalyst.

In a second embodiment, the invention provides a hiding layer-forming silicone composition comprising (F) a reaction product obtained by reacting 100 parts by weight of component (A) with 10 to 200 parts by weight of component (B) as set forth above in the presence of a basic catalyst, (C) 10 to 500 parts by weight of an inorganic powder opacifier per 100 parts by weight of components (A) and (B) combined, and (E) an organic solvent.

DESCRIPTION OF THE PREFERRED EMBODIMENTS

Component (A) in the silicone composition of the invention is a diorganopolysiloxane comprising difunctional structural units (D units) of the following formula (1) as primary structural units.

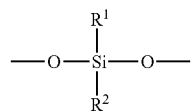

(1)

Herein $R^1$ stands for substituted or unsubstituted alkyl or aryl groups having 1 to 20 carbon atoms, preferably 1 to 12 carbon atoms, for example, alkyl groups such as methyl, ethyl, propyl and butyl, cycloalkyl groups such as cyclohexyl, aryl groups such as phenyl and tolyl, and substituted ones of the foregoing groups in which some or all of the hydrogen atoms are substituted with halogen atoms, cyano groups or the like, such as chloromethyl, trifluoropropyl and cyanoethyl. $R^1$ groups may be the same or different. From the industrial standpoint, methyl and phenyl are preferred.

$R^2$ is selected from among $R^1$, alkenyl groups, preferably having 2 to 8 carbon atoms, such as vinyl, allyl and propenyl, alkoxy groups, preferably having 1 to 8 carbon atoms, such as methoxy, ethoxy and propoxy, alkoxyalkoxy groups, preferably having 2 to 10 carbon atoms, such as methoxyethoxy, hydroxyl and epoxy groups. $R^2$ groups may be the same or different. From the industrial standpoint, methyl, phenyl and vinyl are preferred.

In the formula, each oxygen atom (O) is shared between two adjoining structural units to form a siloxane bond. The structure is preferably end-capped with a hydroxyl group or a monofunctional structural unit of the following formula (2) so that the oxygen atom is shared therebetween.

(2)

Herein $R^1$ and $R^2$ are as defined above, with $R^1$ being preferably methyl or phenyl, and $R^2$ being preferably methyl, phenyl or vinyl, and n is an integer of 1 to 3.

Most often, the diorganopolysiloxane (A) preferably has a linear structure although it may have a branched structure including, in part, trifunctional structural units (T units) of the formula (4) below or tetrafunctional structural units (Q units) of the formula (3) below. It is preferred in the latter case that the content of tri- and tetrafunctional structural units be 5 mol % or less of the entire structural units of one molecule. It is expected that as long as the content of the tri- and tetrafunctional structural units is limited to 5 mol % or less, these units are effective for improving the cure and reducing the viscosity of the composition without compromising the performance of the composition.

(4)

(3)

Herein, $R^2$ is as defined above, with methyl, phenyl or vinyl being preferred for industrial purposes.

The diorganopolysiloxane should have an average degree of polymerization of at least 50, preferably at least 100. A degree of polymerization of less than 50 leads to a decline of temporary bonding force. The upper limit of degree of polymerization is suitably determined in accordance with an intended application of the composition or the like. In order for the diorganopolysiloxane to fully exert its effect, its degree of polymerization should preferably be 50,000 or less, and more preferably 20,000 or less.

The composition of the invention can be cured by prior art well-known methods, preferably by utilizing addition reaction, condensation reaction or radical reaction. For a certain reaction utilized in curing, the diorganopolysiloxane (A) should preferably have a specific functional group.

For addition reaction utilized in curing, the diorganopolysiloxane (A) should preferably have at least two alkenyl groups per molecule. The content of alkenyl groups is desirably 0.001 to 0.1 mole, and especially 0.002 to 0.07 mole per 100 g of the diorganopolysiloxane (A).

For condensation reaction, the diorganopolysiloxane (A) should desirably contain hydroxyl groups in an amount of 0.0001 to 0.05 mole, and especially 0.0002 to 0.01 mole per 100 g of the diorganopolysiloxane (A). Especially preferred is α,ω-dihydroxyorganopolysiloxane blocked with a hydroxyl group at either end.

For radical reaction, the diorganopolysiloxane (A) need not have a specific functional group. For a certain catalyst used in curing, a vinyl-containing diorganopolysiloxane is preferred because of effective cure.

Component (B) is an organopolysiloxane comprising structural units of the following formulae (2) and (3), referred to as M and Q units, respectively, as primary structural units.

(2)

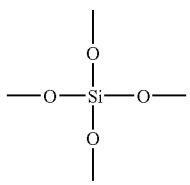
(3)

In formula (2), $R^1$ and $R^2$ are as defined above, with $R^1$ being preferably methyl or phenyl, and $R^2$ being preferably methyl, phenyl or vinyl, n is an integer of 1 to 3.

In formula (3), each oxygen atom (O) is shared between two adjoining structural units to form a siloxane bond. That is, the organopolysiloxane has a skeleton of three-dimensional crosslinked structure which is mostly end-capped with a monofunctional structural unit of the formula (2) so that the oxygen atom is shared therebetween. The inclusion of these structural units is essential to achieve improved scratchability and tack.

The organopolysiloxanes of the simplest structure which can be advantageously used herein are organopolysiloxanes consisting of structural units of formulae (2) and (3), which are generally known as MQ resins.

The MQ resins include a variety of MQ resins which differ in M/Q molar ratio, substituent and functional group, and are known as a base material for silicone pressure-sensitive adhesives. Those MQ resins having a M/Q molar ratio between 0.5 and 1.5 are preferred. MQ resins having a M/Q molar ratio of less than 0.5 are less compatible in the composition whereas MQ resins having a M/Q molar ratio of more than 1.5 can exacerbate the scratchability. It is understood that the MQ resins are not limited to those intended for silicone pressure-sensitive adhesives.

Most often, the organopolysiloxanes consisting of structural units of formulae (2) and (3) are preferred as mentioned above although they may partially contain structural units of the formula (1) or (4). In the latter case, the content of structural units of formulae (1) and (4) is such that the advantages of the inventive composition may not be lost, and specifically 30 mol % or less, especially 20 mol % or less of the entire structural units of one molecule.

Like component (A), the organopolysiloxane (B) should preferably have a specific functional group depending on a certain reaction utilized in curing. For addition reaction utilized in curing, the organopolysiloxane (B) need not always have an alkenyl group.

The amount of component (B) blended is 10 to 200 parts by weight, preferably 20 to 180 parts by weight, and more preferably 20 to 150 parts by weight, per 100 parts by weight of component (A). Less than 10 parts of component (B) results in a hiding layer having insufficient tack whereas more than 200 parts of component (B) results in a hiding layer which is hard and likely to craze.

The inorganic powder opacifier (C) may be selected from conventional materials commonly used for the hiding purpose. Suitable opacifiers include metal powders such as aluminum powder, brass powder and copper powder, oxide powders of similar metals, inorganic pigments such as titanium oxide and carbon black. Of these, aluminum powder is preferred because of its good hiding power.

The amount of opacifier (C) blended is 10 to 500 parts by weight, preferably 20 to 400 parts by weight, and more preferably 30 to 400 parts by weight, per 100 parts by weight of components (A) and (B) combined. Less than 10 parts of the opacifier fails to achieve the desired hiding effect whereas more than 500 parts of the opacifier adversely affects the tack of a hiding layer.

The curing catalyst (D) is used to induce curing reaction by way of addition reaction, condensation reaction, radical reaction or the like and may be selected from such catalysts commonly used for that purpose.

In an embodiment wherein addition reaction is utilized as the curing reaction, as previously mentioned, component (A) should have at least two alkenyl groups per molecule, and component (B) should preferably have at least two alkenyl groups per molecule. In this embodiment, the curing catalyst (D) includes an organohydrogenpolysiloxane having at least three silicon-bonded hydrogen atoms (SiH groups) on the molecule as a component capable of crosslinking with component (A) or (B) and a platinum group metal catalyst.

The organohydrogenpolysiloxane used herein preferably has structural units of the formula (5) and is end-capped with a group of the formula (6), both shown below.

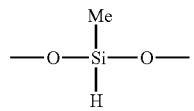
(5)

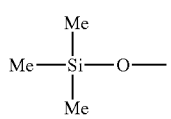
(6)

The organohydrogenpolysiloxane is blended in such amounts that the moles of silicon-bonded hydrogen atoms (SiH groups) is 1 to 10 times, especially 1.5 to 8 times the total moles of alkenyl groups in components (A) and (B).

Examples of the platinum group metal catalyst include, but are not limited to, platinum black, chloroplatinic acid, chloroplatinic acid-olefin complexes, chloroplatinic acid-alcohol coordinate compounds, rhodium metal, and rhodium-olefin complexes. The platinum group metal catalyst is preferably used in such amounts that 0.0005 to 0.1 part, especially 0.001 to 0.01 part by weight of metal is available per 100 parts by weight of components (A) and (B) combined, because fully cured coatings can be formed.

In another embodiment wherein cure proceeds with condensation reaction, the curing catalyst used is selected from among acids such as p-toluenesulfonic acid, maleic acid and phosphoric acid, bases such as triethylamine, ethylenediamine and tetramethylammonium hydroxide, and organometallic compounds such as zinc octylate, iron octylate, aluminum triacetylacetonate, tetrabutyl titanium, and dioctyltin diacetate. In this embodiment, the curing catalyst is preferably used in an amount of 0.1 to 5 parts, especially 0.2 to 4 parts by weight per 100 parts by weight of components (A) and (B) combined.

In a further embodiment utilizing radical reaction, organic peroxides such as benzoyl peroxide and di(tert-butyl) peroxide may be used as the curing catalyst. The amount of the curing catalyst blended, which differs with the type of organic peroxide, is generally 1 to 5 parts, especially 2 to 4 parts by weight per 100 parts by weight of components (A) and (B) combined.

Owing to its nature, the curing catalyst (D) is preferably blended in the composition immediately before the composition is coated. Particularly in the embodiment utilizing addition reaction, once the curing catalyst is blended in the composition, reaction can proceed even at room temperature, leading to a short pot life which is inconvenient to the step of coating a hiding layer. Then in the embodiment utilizing addition reaction, an addition reaction regulator is desirably blended in the inventive composition for the purpose of providing an appropriate pot life.

Well-known addition reaction regulators may be used. Examples include acetylene alcohols such as 3-methyl-1-butyn-3-ol, 3,5-dimethyl-1-hexyn-3-ol, 3-methyl-1-penten-3-ol, and phenylbutynol, acetylene compounds such as 3-methyl-3-penten-1-yne and 3,5-dimethyl-1-hexyn-3-yne, reaction products of the acetylene compounds with alkoxysilanes and siloxanes, reaction products of the acetylene compounds with hydrogensilanes and siloxanes, vinylsiloxanes such as tetramethylvinylsiloxane cyclics, organic nitrogen compounds such as benzotriazole, organic phosphorus compounds, oxime compounds and organic chromium compounds. The amount of the addition reaction regulator blended is preferably 0.01 to 10 parts, and more preferably 0.1 to 7 parts by weight per 100 parts by weight of components (A) and (B) combined.

The organic solvent (E) is used for the purposes of improving the applicability of the composition to various substrates, and adjusting the coating weight and viscosity of the composition. Any desired one of organic solvents such as toluene, xylene, ethyl acetate, acetone, methyl ethyl ketone, and hexane may be used as long as they permit the other components to be uniformly dissolved and are inert to the other components and addition reaction regulator in the composition.

The amount of the organic solvent blended is suitably determined in accordance with a particular purpose and is preferably 0 to 5,000 parts, and especially 0 to 1,000 parts by weight per 100 parts by weight of component (A).

Any desired method may be used in preparing the composition of the invention as long as the respective components are effectively and uniformly dissolved or dispersed. In one preferred method, for example, the components excluding the curing catalyst (D) are mixed and dissolved and dispersed in a ball mill or suitable mixer, and the curing catalyst (D) is added and mixed therewith immediately before coating.

In another convenient method of preparing the composition, a commercially available silicone pressure-sensitive adhesive is utilized as a premix of components (A), (B), (D) and (E). The composition of the invention can be prepared by properly selecting a commercially available silicone pressure-sensitive adhesive and blending the inorganic powder opacifier (C) and optionally, the organic solvent (E) therewith. On use, a predetermined amount of a curing catalyst for the silicone pressure-sensitive adhesive is blended in the composition, which becomes ready to cure.

Several considerations should be made in selecting the silicone pressure-sensitive adhesive. First, in the presence of the inorganic powder opacifier (C), the silicone pressure-sensitive adhesive is not prohibited from curing and does not allow side reaction to proceed. Secondly, while the silicone pressure-sensitive adhesive is generally characterized by a relatively low bonding force, the desired tack must be exerted between a substrate and a hiding layer resulting from the silicone pressure-sensitive adhesive. When applied to the present invention, a silicone pressure-sensitive adhesive having a very low bonding force is selected so that the desired tack is obtainable. Specifically, the preferred adhesive provides a bonding force of less than about 1 N/25 mm as measured under the standard conditions including stainless steel plate, 180° peel, and adhesive layer thickness 30 µm.

When the performance of the invention is not achievable with only the commercially available silicone pressure-sensitive adhesive, a composition satisfying the performance of the invention can be prepared by additionally blending one or more of components (A), (B) and (D) therein.

In a second embodiment of the invention, (F) a reaction product obtained by previously reacting the diorganopolysiloxane (A) with the organopolysiloxane (B) in the presence of a basic catalyst is used instead of the diorganopolysiloxane (A) and the organopolysiloxane (B). Use of the reaction product (F) leads to better cure and tack.

The components (A) and (B) used to form the reaction product are generally the same as exemplified above. It is preferred to use a diorganopolysiloxane blocked with a hydroxyl group at either end of its molecular chain as component (A) and a MQ resin consisting of M and Q units as component (B).

Suitable basic catalysts include potassium hydroxide and ammonia and are preferably added in an amount of 0.0001 to 5 parts, and more preferably 0.001 to 0.1 parts by weight per 100 parts by weight of components (A) and (B) combined. The reaction is preferably carried out at about 20 to 200° C. for about 1 to 10 hours. At the end of reaction, the catalyst is deactivated and removed by suitable means such as distillation, neutralization, and treatment with ion exchangers or adsorbents. Addition of a diluent solvent or agitation may assist in uniform progress of reaction.

In the second embodiment, a curing catalyst is optionally blended because a hiding layer can be formed even without the curing catalyst. The amount of the curing catalyst, if blended, is smaller than the aforementioned amount of component (D). If the curing catalyst is blended, the conditions set therefor are the same as described for components (D) and (E). An appropriate amount of the curing catalyst is determined in accordance with the desired performance of the hiding layer.

The coating and printing method for the hiding layer may be screen printing, gravure printing or seal printing. Screen printing is preferred because a thick film can be formed.

The hiding layer generally has a thickness of 2 to 100 µm when the hiding layer is to be rubbed off by scratching. Too thin a hiding layer may fail to provide the hiding effects whereas too thick a hiding layer may be difficult to rub off by scratching and wasteful.

After coating and printing, the composition is cured in a conventional manner corresponding to a particular curing mode, for example, by heating. In the case of addition reaction, for example, the composition can be cured by heating at about 100° C. for about 10 to 30 seconds.

EXAMPLE

Examples of the invention are given below by way of illustration and not by way of limitation. Note that Me is methyl and Vi is vinyl.

Example 1

A hiding layer-forming composition was prepared by mixing 100 parts by weight of a diorganopolysiloxane whose skeleton structure consisted of 1.5 mol % of structural units of formula (7) and 98.5 mol % of structural units of formula (8), blocked with a structural unit of formula (9) at either end of its molecular chain, and having an average degree of polymerization of 8,000 as component (A),

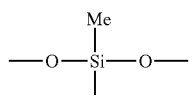

(7)

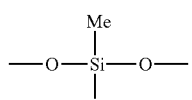

(8)

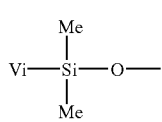

(9)

100 parts by weight of an organopolysiloxane consisting of 50 mol % of structural units of formula (3) and 50 mol % of structural units of formula (6) as component (B),

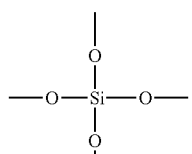

(3)

(6)

200 parts by weight of aluminum powder Silver Paste 606M (Seiko Advance Ltd.) as component (C), a methylhydrogenpolysiloxane comprising 95 mol % of structural units of formula (5), blocked with a structural unit of formula (6) at either end of its molecular chain, and having a viscosity of 25 mPa·s at 25° C. as a part of component (D), in such an amount that the moles of Si—H groups was 5 times the moles of vinyl groups in component (A),

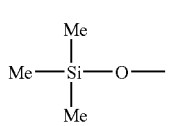

(5)

800 parts by weight of toluene as component (E), and 5 parts by weight of 3-methyl-1-butyn-3-ol as the addition reaction regulator, and agitating them at 20–40° C. for 3 hours for dissolution and dispersion. To the dispersion was added 0.05 part by weight calculated as platinum of the complex of platinum with vinylsiloxane as another part of component (D). This was further agitated, completing the composition.

Using an applicator, the composition was coated onto a 250 g/m² paper sheet having an image (to be hidden) printed on one surface. The coating was heated at 100° C. for 10 seconds, forming a hiding layer of 25 μm thick.

The image was not visible through the hiding layer to the naked eyes. That is, the hiding layer had a sufficient hiding power. Even when the coated sheet was bent and when the hiding layer on the surface was rubbed with a finger inside, the hiding layer did not peel off, indicating satisfactory tack. When the hiding layer was scratched with a nail or coin, it was readily removed so that the image became visible, indicating good scratchability.

Comparative Example 1

A composition was prepared as in Example 1 except that the amounts of components (A) and (B) were changed to 190 parts and 10 parts by weight, respectively. The composition was similarly coated onto a paper sheet to form a hiding layer which was examined for hiding, tack and scratch properties.

The hiding and scratch ratings were satisfactory. When the hiding layer on the surface was rubbed 10 strokes with a finger inside, it partially peeled off, indicating insufficient tack.

Comparative Example 2

A composition was prepared as in Example 1 except that the amounts of components (A) and (B) were changed to 50 parts and 150 parts by weight, respectively. The composition was similarly coated onto a paper sheet to form a hiding layer which was examined for hiding, tack and scratch properties.

The hiding and scratch ratings were satisfactory. When the coated sheet was bent, the hiding layer crazed, indicating insufficient tack.

Example 2

A flask was charged with 100 parts by weight of a diorganopolysiloxane consisting of 100 mol % of structural units of formula (8), blocked with a hydroxyl group at either end of its molecular chain, and having an average degree of polymerization of 8,000 as component (A), 100 parts by weight of an organopolysiloxane consisting of 50 mol % of structural units of formula (3) and 50 mol % of structural units of formula (6) as component (B), 400 parts by weight of toluene as component (E), and 0.002 part by weight of potassium hydroxide as the basic catalyst. With stirring in a nitrogen atmosphere, the contents were refluxed for reaction at an interior temperature of 110° C. for 10 hours. The interior temperature was lowered to 90° C., after which 0.01 part by weight of ethylene chlorohydrin was added to the reaction mixture. This was agitated for 3 hours and then neutralized, obtaining a reaction product.

To 600 parts by weight of the reaction product were added 200 parts by weight of aluminum powder Silver Paste 606M (Seiko Advance Ltd.) as component (C) and 400 parts by weight of toluene as component (E). The mixture was agitated at 20–40° C. for 3 hours, obtaining a hiding layer-forming composition.

As in Example 1, the composition was coated onto a paper sheet to form a hiding layer which was examined for hiding, tack and scratch properties.

The image was not visible through the hiding layer to the naked eyes. That is, the hiding layer had a sufficient hiding power. Even when the coated sheet was bent and when the hiding layer on the surface was rubbed with a finger inside, the hiding layer did not peel off, indicating satisfactory tack. When the hiding layer was scratched with a nail or coin, it was readily removed so that the image became visible, indicating good scratchability.

Example 3

A hiding layer-forming composition was prepared by mixing 400 parts by weight of a silicone pressure-sensitive adhesive X-40-3102 by Shin-Etsu Chemical Co., Ltd. (solids 50%, toluene 50%, a bonding force of 0.8 N/25 mm as measured under the standard conditions including stainless steel plate, 180° peel, and adhesive layer thickness 30 μm) as a part of components (A), (B), (D) and (E), 200 parts by weight of aluminum powder Silver Paste 606M (Seiko Advance Ltd.) as component (C), and 600 parts by weight of toluene as component (E), and agitating them at 20–40° C. for 3 hours for dissolution and dispersion. The dispersion was further blended with 0.05 part by weight calculated as platinum of the complex salt of platinum with vinylsiloxane as component (D), which was agitated, completing the composition.

As in Example 1, the composition was coated onto a paper sheet to form a hiding layer which was examined for hiding, tack and scratch properties.

The image was not visible through the hiding layer to the naked eyes. That is, the hiding layer had a sufficient hiding power. Even when the coated sheet was bent and when the hiding layer on the surface was rubbed with a finger inside, the hiding layer did not peel off, indicating satisfactory tack. When the hiding layer was scratched with a nail or coin, it was readily removed so that the image became visible, indicating good scratchability.

Comparative Example 3

A hiding layer-forming composition was prepared by mixing 700 parts by weight of an acrylic resin YR-102 (Toyo Rayon Co., Ltd.) as a synthetic resin vehicle and 300 parts by weight of aluminum powder Silver Paste 606M (Seiko Advance Ltd.) as component (C), and agitating them at 20–40° C. for 3 hours for dissolution and dispersion.

As in Example 1, the composition was coated onto a paper sheet to form a hiding layer which was examined for hiding, tack and scratch properties. The image was not visible through the hiding layer to the naked eyes. That is, the hiding layer had a sufficient hiding power. When the hiding layer on the surface was rubbed with a finger inside, it partially peeled off, indicating insufficient tack.

The silicone composition according to the invention is effectively curable and capable of forming a hiding layer which temporarily adheres well to various substrates of paper, synthetic paper and plastic film without a need for an intercoat or parting agent while it remains scratchable.

Japanese Patent Application No. 2001-215244 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A hiding layer-forming silicone composition comprising
   (A) 100 parts by weight of a linear diorganopolysiloxane comprising structural units of the following formula (1) and having an average degree of polymerization of at least 50,

wherein $R^1$ is a substituted or unsubstituted alkyl or aryl group having 1 to 20 carbon atoms, $R^2$ is $R^1$, alkenyl, alkoxy, alkoxyalkoxy, hydroxyl or epoxy group, each of $R^1$ and $R^2$ is identical or different, and O is shared between adjoining structural units to form a siloxane bond, said linear diorganopolysiloxane comprising 5 mol % or less of tri- and tetrafunctional structural units, (B) 10 to 200 parts by weight of an organopolysiloxane comprising structural units of the following formulae (2) and (3):

wherein $R^1$ and $R^2$ are methyl or phenyl, each of $R^1$ and $R^2$ is identical or different, n is an integer of 1 to 3, and O is shared between adjoining structural units to form a siloxane bond, said branched diorganopolysiloxane comprising 30 mol % or less of di- and trifunctional structural units, (C) 200 to 500 parts by weight of an inorganic powder opacifier, selected from the group consisting of aluminum, brass, oxidized brass, copper, and carbon black, per 100 parts by weight of components (A) and (B) combined, (D) an effective amount of a curing catalyst for causing components (A) and (B) to cure, and (E) an organic solvent.

2. The silicone composition of claim 1 wherein the diorganopolysiloxane (A) or the diorganopolysiloxane (A) and the organopolysiloxane (B) have alkenyl groups, and the curing catalyst (D) includes an organohydrogenpolysiloxane having at least three silicon-bonded hydrogen atoms on the molecule and a platinum group metal catalyst.

3. A hiding layer-forming silicone composition comprising
   a reaction product obtained by reacting 100 parts by weight of component (A) a linear diorganopolysiloxane comprising structural units of the following formula (1) and having an average degree of polymerization of at least 50,

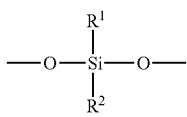(1)

wherein $R^1$ is a substituted or unsubstituted alkyl or aryl group having 1 to 20 carbon atoms, $R^2$ is $R^1$, alkenyl, alkoxy, alkoxyalkoxy, hydroxyl or epoxy group, each of $R^1$ and $R^2$ is identical or different, and O is shared between adjoining structural units to form a siloxane bond, said linear diorganopolysiloxane comprising 5 mol % or less of tri- and tetrafunctional structural units, with 10 to 200 parts by weight of a branched organopolysiloxane comprising structural units of the following formulae (2) and (3):

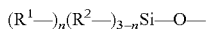(2)

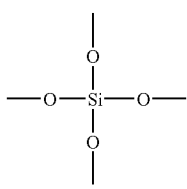(3)

wherein $R^1$ and $R^2$ are as defined above, each of $R^1$ and $R^2$ is identical or different, n is an integer of 1 to 3, and O is shared between adjoining structural units, said branched diorganopolysiloxane comprising 30 mol % or less of di- and trifunctional structural units, to form a siloxane bond in the presence of a basic catalyst, (C) 10 to 500 parts by weight of an inorganic powder opacifier per 100 parts by weight of components (A) and (B) combined, and (E) an organic solvent.

4. A substrate having an image thereon, wherein said image is coated with a scratchable hiding layer silicon film composition comprising (A) 100 parts by weight of a linear diorganopolysiloxane comprising structural units of the following formula (1) and having an average degree of polymerization of at least 50,

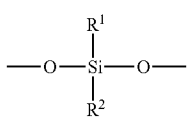(1)

wherein $R^1$ is a substituted or unsubstituted alkyl or aryl group having 1 to 20 carbon atoms, $R^2$ is $R^1$, alkenyl, alkoxy, alkoxyalkoxy, hydroxyl or epoxy group, each of $R^1$ and $R^2$ is identical or different, and O is shared between adjoining structural units to form a siloxane bond, said linear diorganopolysiloxane comprising 5 mol % or less of tri- and tetrafunctional structural units, (B) 10 to 200 parts by weight of a branched organopolysiloxane comprising structural units of the following formulae (2) and (3):

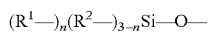(2)

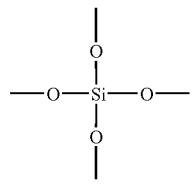(3)

wherein $R^1$ and $R^2$ are as defined above, each of $R^1$ and $R^2$ is identical or different, n is an integer of 1 to 3, and O is shared between adjoining structural units to form a siloxane bond, said branched diorganopolysiloxane comprising 30 mol % or less of di- and trifunctional structural units, (C) 10 to 500 parts by weight of an inorganic powder opacifier per 100 parts by weight of components (A) and (B) combined, (D) an effective amount of a curing catalyst for causing components (A) and (B) to cure, and (B) an organic solvent.

5. The substrate of claim 4, wherein the diorganopolysiloxane (A) or the diorganopolysiloxane (A) and the organopolysiloxane (B) have alkenyl groups, and the curing catalyst (D) includes an organohydrogenpolysiloxane having at least three silicon-bonded hydrogen atoms on the molecule and a platinum group metal catalyst.

6. A substrate having an image thereon, wherein said image is coated with a scratchable hiding layer silicon film composition comprising (F) a reaction product obtained by reacting 100 parts by weight of component (A) 100 parts by weight of a linear diorganopolysiloxane comprising structural units of the following formula (1) and having an average degree of polymerization of at least 50, (1)

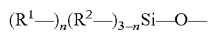

wherein $R^1$ is a substituted or unsubstituted alkyl or aryl group having 1 to 20 carbon atoms, $R^2$ is $R^1$, alkenyl, alkoxy, alkoxyalkoxy, hydroxyl or epoxy group, each of $R^1$ and $R^2$ is identical or different, and O is shared between adjoining structural units to form a siloxane bond, said linear diorganopolysiloxane comprising 5 mol % or less of tri- and tetrafunctional structural units, with 10 to 200 parts by weight of component (B) 10 to 200 parts by weight of a branched organopolysiloxane comprising structural units of the following formulae (2) and (3):

$(R^1\text{---})_n(R^2\text{---})_{3-n}Si\text{---}O\text{---}$ (2)

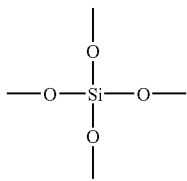
(3)

wherein $R^1$ and $R^2$ are as defined above, each of $R^1$ and $R^2$ is identical or different, n is an integer of 1 to 3, and 0 is shared between adjoining structural units to form a siloxane bond, said branched diorganopolysiloxane comprising 30 mol % or less of di- and trifunctional structural units, in the presence of a basic catalyst, (C) 10 to 500 parts by weight of an inorganic powder opacifier per 100 parts by weight of components (A) and (B) combined, and (E) an organic solvent.

7. The hiding layer-forming silicone composition of claim 1, wherein the inorganic powder opacifier is blended in an amount of 200 parts by weight per 100 parts by weight of components (A) and (B) combined.

8. The hiding layer-forming silicone composition of claim 1, wherein the inorganic powder opacifier is a metal powder.

9. The hiding layer-forming silicone composition of claim 1, wherein the molar ratio of M unit represented by formula (2) and Q unit represented by formula (3) is 0.5 to 1.5.

10. The hiding layer-forming silicone composition of claim 1, wherein the organopolysiloxane of component (B) consists essentially of the structural units of formulae (2) and (3).

11. The hiding layer-forming silicone composition of claim 3, wherein $R^1$ and $R^2$ in formula (2) are methyl or phenyl.

12. The hiding layer-forming silicone composition of claim 3, wherein the inorganic powder opacifier is blended in an amount of 200 parts by weight per 100 parts by weight of components (A) and (B) combined.

13. The hiding layer-forming silicone composition of claim 3, wherein the inorganic powder opacifier is a metal powder.

14. The hiding layer-forming silicone composition of claim 3, wherein the molar ratio of M unit represented by formula (2) and Q unit represented by formula (3) is 0.5 to 1.5.

15. The hiding layer-forming silicone composition of claim 3, wherein the organopolysiloxane of component (B) consists essentially of the structural units of formulae (2) and (3).

* * * * *